C. L. WILLOUGHBY & J. JACOBSON.
DEVICE FOR EXHIBITING PICTURES.
APPLICATION FILED SEPT. 21, 1907.
954,555.
Patented Apr. 12, 1910.
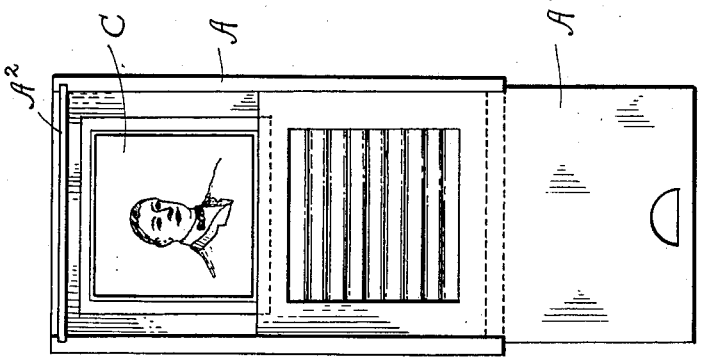
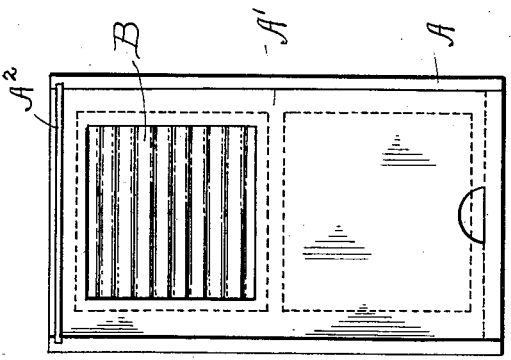
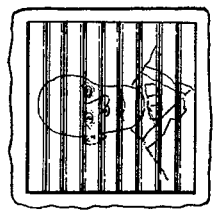

UNITED STATES PATENT OFFICE.

CHARLES L. WILLOUGHBY AND JOHN JACOBSON, OF NEW YORK, N. Y.

DEVICE FOR EXHIBITING PICTURES.

954,555.  Specification of Letters Patent.  Patented Apr. 12, 1910.

Application filed September 21, 1907. Serial No. 393,907.

To all whom it may concern:

Be it known that we, CHARLES L. WILLOUGHBY and JOHN JACOBSON, citizens of the United States, and residents of New York city, in the county of New York and State of New York, have invented a certain new and useful Device for Exhibiting Pictures, of which the following is a specification.

This invention relates to improvements in devices for exhibiting pictures.

In the drawings;—Figure 1 is a plan view of a device constructed in accordance with this invention wherein the distortion screen is shown in its closed position. Fig. 2 is a similar view wherein the distortion screen is shown as withdrawn from before the picture. Fig. 3 is a cross section of the construction as shown in Fig. 1. Figs. 4, 5 and 6 are detail views exaggerated to show the shape in section of various forms of the screen. Fig. 7 is a detail view of the screen; and showing thereon in light lines a distorted view of the picture viewed.

The object which the present invention has in view is to produce an amusement device of the character herein described wherein, by the interposition of a movable cover or screen, the features of a picture are caused to appear as moving in distorted fashion, when the said screen is moved.

With this object in view the device embodying the invention as shown in the drawings consists in a box-like case, A, adapted to receive and hold the photographs, C.
The box is provided at the end with a slide, A², for the admission of light to the interior of the box. This slide may be transparent or clouded. The sides of the box at the upper edge are grooved to receive the cover, A¹. This cover is constructed of any suitable material, and is provided at the upper end with a glass screen, B, suitably secured in the cover, A.

The screen, B, is formed of transparent material, such as glass, and is so formed that it is provided with one or more lens-like projections or concavities in one or both surfaces. In the preferred form the surfaces are molded to a series of corrugations, preferably disposed parallel or very slightly divergent each to and from the other. These corrugations form prismatic lenses. For the purpose herein employed the projection of the corrugations constitute the strength of the lenses and regulate the focus of the view. They are, therefore, very slight in the preferred form, where the transition from view to view is intended to be subtle.

As indicated the lenses may be produced in the form of parallel corrugations or one or more waves in the surface producing varying thicknesses in the screen, B. As shown in the drawings, these corrugations or curved surfaces may be produced on both sides of the screen, B.

With this construction, the operation of the invention is as follows: The photographs or pictures, C, in quantities of one or more are placed in position within the box, A. The cover, A¹, being withdrawn to permit this placement. The cover is then moved into position where the screen, B, rests directly above the picture, C. The end of the box carrying the slide, A², is turned toward the light and the person using the device approaches his face to the screen, B, until his eye is in the proper focus. The features of the picture will now be distorted to a greater or lesser extent by reason of the plurality of lens-like surfaces on the screen, B. By now moving the cover slowly the distortion changes, producing a seeming movement of the features and in many cases very comical and amusing, and interesting transitions, the transitions seeming due to the movement of the features.

Any suitable means may be provided for moving the cover, A, with the screen, B, without varying the scope of this invention.

As the pictures are exposed, the cover, A, is withdrawn and the uppermost picture is then removed from the group and placed in the lower end of the box, A.

Having thus described the invention, it is claimed:—

1. A device for exhibiting pictures comprising a box having an inlet to admit light above the picture; an irregular lens superimposed above the picture and adapted to be laterally moved relative to the picture.

2. A device for exhibiting pictures comprising a box adapted to receive pictures to be viewed, and having an inlet to admit light above the picture; a movable screen comprising a transparent plate of irregular thicknesses to produce lens-like areas therein of different focus, and guides wherein said screen is moved laterally.

3. A device for exhibiting pictures comprising a receptacle for the pictures to be viewed; an opening adapted to admit light above the picture; a screen to cover said picture formed from transparent material, and having a corrugated surface; and guides to support said screen, and wherein the said screen is moved laterally.

4. A device for exhibiting pictures comprising a box adapted to receive pictures, and having an inlet in the side thereof to admit light above the pictures; a slidable cover for said box having a transparent screen having a corrugated surface to rest above picture, and grooves formed in the side of said box to govern the movement of said cover.

5. A device of the character described comprising a box rectangular in form adapted to serve as a receptacle for photographs, a cover for said box located at a predetermined distance from the bottom thereof and adapted to be moved on a plane parallel to the bottom of said box, an opening in said cover, a lens fitted in said opening comprising a plate of transparent material having corrugations formed therein, and means for admitting light within said box between the bottom thereof and the under side of said lens.

Signed at New York in the county of New York and State of New York this 19th day of September A. D. 1907.

CHARLES L. WILLOUGHBY.
JOHN JACOBSON.

Witnesses:
WM. PAXTON,
FRANK M. ASHLEY.